United States Patent [19]

Fund et al.

[11] 3,937,097

[45] Feb. 10, 1976

[54] BALL-EQUIPPED SCREW AND NUT MECHANISMS

[75] Inventors: Jean Claude Fund, Bourdeau; Jacques Detraz, Chambery, both of France

[73] Assignee: La Technique Integrale S.A., Chambery, France

[22] Filed: Oct. 21, 1974

[21] Appl. No.: 516,502

[30] Foreign Application Priority Data

Oct. 30, 1973 France .............................. 73.38614

[52] U.S. Cl. ............................................. 74/424.8 R
[51] Int. Cl.² ............................................. F16H 4/18
[58] Field of Search ...................... 74/424.8 R, 459

[56] References Cited

UNITED STATES PATENTS 3,068,714   12/1962   Davis ................................... 74/459

*Primary Examiner*—Leonard H. Gerin
*Attorney, Agent, or Firm*—Daniel M. Rosen

[57] ABSTRACT

A ball-equipped screw and nut mechanism including a train of balls in a helical ball-circulation channel defined between mating surfaces of screw and nut members. The screw member is tubular and has within its bore a core with a helical groove as a ball recirculation channel which communicates with the ball-circulation channel via radial holes extending through the wall of the screw member.

7 Claims, 5 Drawing Figures

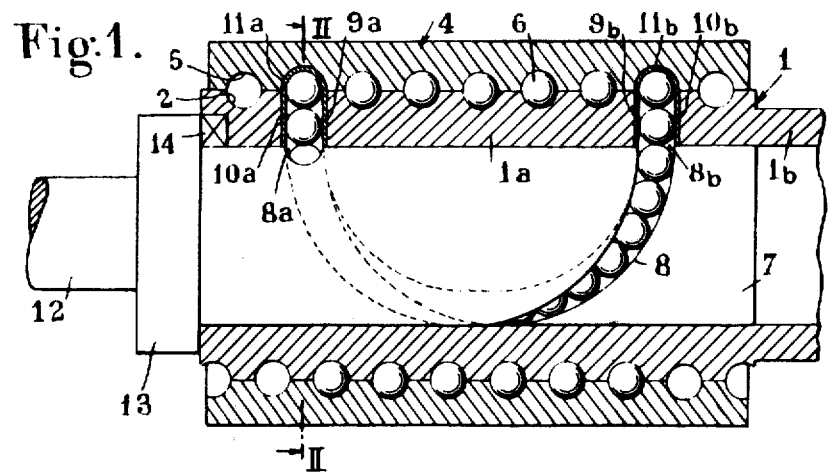
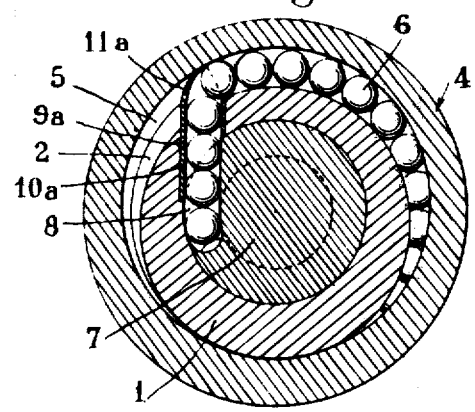
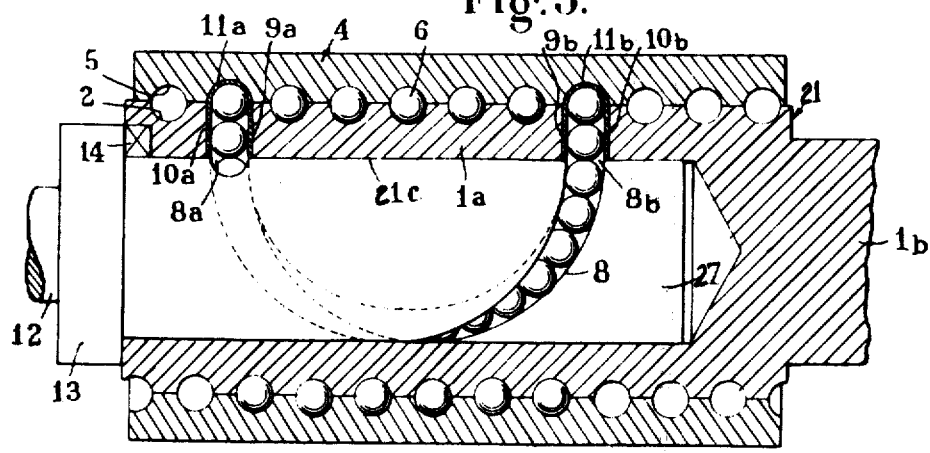

BALL-EQUIPPED SCREW AND NUT MECHANISMS

BACKGROUND OF THE INVENTION

This invention relates to a ball-equipped screw and nut mechanism for converting rotary motion into translative motion, and for performing the reverse conversion.

Mechanisms of this type are known wherein there is at least one channel for circulation of the balls, bounded by corresponding helical grooves in the screw and nut. Such mechanisms are widely used for all motion conversions of the type indicated, where high efficiency and silent and sure functioning are required.

The motion conversion mechanism, according to this invention, is adaptable to all of the applications mentioned, but is particularly advantageous for those in which the nut and the screw of the mechanism must be actuated by an alternating relatively helical motion of low axial amplitude. Several methods are known for these latter applications, but have been found to be disadvantageous.

A first method was contemplated limiting the number of balls engaged in the circulation channel in such a way that, for an extreme position determined by the nut on the screw, an interval corresponding substantially to the axial travel of the nut would be present between the head of the train of balls and the opposite end of the ball circulation channel. This method was found to be unsuitable, however, because, toward the end of the course of the nut, the balls slide in the circulation channel, rather than rolling therein, thus causing the temporary disappearance of the previously mentioned advantages of the mechanism in question.

In order to lessen the disadvantages of this first method, use was made of a locked circulation of balls, of the type already known for such mechanisms, and which provide for substantial axial travel of the nut. The locked circulation of the balls can also be achieved by particular machining of the nut, and the addition to the latter of auxiliary elements for guiding the balls. The nuts thus adapted however do not have a structure for symmetrical rotation and thus create a lack of balance which is troublesome in case of rapid rotation. Moreover, some of these known nuts have an external shape which is not compatible with the requirements of the particular application for which the screw and nut mechanism is intended.

SUMMARY OF THE INVENTION

The motion conversion mechanism, according to this invention, likewise comprises at least one ball circulation channel, bounded by corresponding helical grooves in the screw and nut, and at least one channel adapted for recirculation of the balls. It is characterized by the fact that the screw comprises a coaxial drilled hole, in which is held a cylindrical core, provided, on its lateral surface, with at least one helical channel or groove for recirculation, with an axial length shorter than those of the nut and the core, and a width slightly greater than the diameter of the balls. Substantially radial holes through the screw provide communication for the ends of said helical channel or groove of the core, with the bottom of at least one of the helical grooves of the screw. Means is provided at the level of entry of said radial drilled holes for the purpose of guiding the balls between the circulation channel and the channel or groove for recirculation of the balls.

The ball-equipped screw and nut mechanism, according to this invention, thus has a means which, in the course of the relative displacement of the screw and the nut, assures continuous rolling of the balls, with minimum friction and consequently with an always maximum efficiency in the conversion of motion, and completely silent operation. Moreover, since the means which makes possible the recirculation of the balls is located in the screw of the mechanism, its use is possible regardless of the external shape of the nut, and without the need to perform any complicated machining of the latter which would be likely to increase production cost considerably. In addition, the machining of the screw member of the mechanism, according to this invention, is simple, rapid and economical, as it consists exclusively of drilling two radial holes, in the case of a tubular screw, and an additional coaxial hole, possibly recessed, in the case of a solid screw. So far as the core and the helical channel or groove on its lateral surface are concerned, they are particularly easy to create, either by a casting of metal or synthetic material, or by machining a helical groove in the outer surface of a cylindrical core.

The means provided for guiding the balls can consist, for example, of tubes, particularly of synthetic material, each one comprising an element engaged by the corresponding radial drilled hole of the screw, and an element engaged, with a degree of play, by the ball circulation channel, the latter element being shaped to guide the passage of the balls between the circulation channel and the recirculation channel or groove. As a variation, the means for guiding the balls can consist of helical elements, made of metal or synthetic material, which are engaged with a degree of play, by the ball circulation channel, and which are attached to the screw by any appropriate means, at the level of entry of the radial drilled holes.

By way of example, several embodiments of the ball-equipped screw and nut mechanism, according to this invention, are explained below, and illustrated schematically in the attached drawings.

BRIEF DESCRIPTION OF THE DRAWINGS

FIG. 1 is a sectional view on an axial plane of a first embodiment of the invention.

FIG. 2 is a sectional view taken along line II — II of FIG. 1.

FIG. 3 is a view, corresponding to FIG. 1, showing a second embodiment of the invention.

DETAILED DESCRIPTION OF THE PREFERRED EMBODIMENTS

Figure 4:
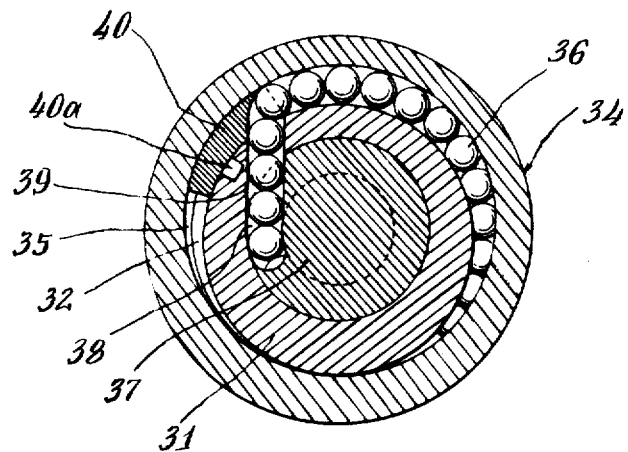
FIG. 4 is a sectional view corresponding to FIG. 2, showing a variation in the means for guiding the balls.

In FIG. 1, 1 designates a tubular metal component; part 1a of the lateral surface of this component is provided with a helical groove 2, of specific pitch and width, while its part 1b on the outside forms a seat for the corresponding end of the screw, making it possible, for example, to couple it to a machine component such as a lathe bed, by means of an appropriate bearing.

Over part 1a of screw 1 is adapted a nut 4 in the form of a tubular coupling. The inside cylindrical surface of nut 4 is cut by a helical groove 5 of the same pitch and width as helical groove 2 of screw 1. Thus, the two helical grooves 2 and 5 bound between them a helical channel, in which balls 6, of a diameter slightly less than that of the section of said helical channel, can circulate so as to cause the transmission of forces between screw 1 and nut 4, by known means for mechanisms of this kind.

In the coaxial hole of the tubular element 1 is engaged a cylindrical core 7 consisting, for example, of solid metal; on the lateral surface of core 7 there has been machined a helical groove 8, whose axial length is less than that of nut 4 and less than that of core 7 itself, as is seen in FIG. 1, while its width is a little greater than the diameter of balls 6. In the embodiment illustrated in FIG. 1, the axial length of helical groove 8 is exactly equal to its pitch, although its two ends, 8a and 8b, are on the same generatrix of the lateral surface of core 7. This particular feature, however, is not at all indispensable for the application of this invention, as the two ends, 8a and 8b, can be on different generatrices, for example, diametrically opposed to each other, and the axial length of said helical groove 8 can then be less than, greater than, or even a multiple of its pitch.

Two radial drilled holes 9a and 9b traverse the wall of the tubular element 1, so as to cause ends 8a and 8b of helical groove 8 to communicate with the bottom of helical groove 2 of screw 1. In the radial drilled holes 9a and 9b are engaged, practically without play, the lower or inner elements, 10a and 10b, respectively, of tubes of synthetic material; the upper or outer elements, 11a and 11b, respectively, of these tubes, are engaged, with a degree of play, in the helical channel bounded by grooves 2 and 5.

As is particularly evident in FIG. 2, elements 11a and 11b of the two tubes, which are engaged in the ball circulation channel 6, are shaped such that one of these elements guides the passage of balls 6 of circulation channel 2-5 into the corresponding drilled radial hole of the screw, and the other of these elements guides the passage of balls 6 of the other radial drilled hole of screw 1 into said circulation channel 2-5. In fact, elements 11a and 11b of the two tubes of synthetic material are curved inward so as to confer the least possible curvature to the balls circuit at the level of the entries of radial drilled holes 9a and 9b.

It is equally remarkable that, by virtue of the helical shape of the ball recirculation channel formed by groove 8, the curve of the closed circuit travelled by the balls remains slight at all points on said circuit, including entries 8a and 8b of said helical groove 8. The slight curvature and the regularity of the curvature of the closed ball circuit are extremely favorable to the efficiency and to the silent functioning of the mechanism covered by this invention, and to the mechanism's durability, as it is possible in this way to avoid subjecting the balls to repeated impacts, which could lead to their wear or even to their rupture.

In FIG. 1, nut 4 is represented in its relative median position with respect to the threaded portion, 1a of screw 1. From this median portion, nut 4 can have a relative helical displacement toward the right or toward the left, the axial displacement being at the most equal to the pitch of helical grooves 2 and 5, in order to prevent opening of the closed ball circuit and possible escape of the balls. In general, the escape of the balls is prevented by giving the axial distance between ends 8a and 8b of helical groove 8 a value less than or equal to the difference between the axial length of the nut and its axial travel.

In the embodiment illustrated in FIGS. 1 and 2, the end of the core 7 opposite part 1b of tubular screw 1 emerges from the latter, and forms a cylindrical journal 12. In addition, between journal 12 and the part of core 7 inside tubular screw, there is fitted a collar 13, of outside diameter greater than that of the coaxial hole of tubular screw 1, for the purpose of immobilizing core 7 axially inside tubular screw 1. The immobilization in rotation of core 7, inside tubular screw 1, which is indispensable in order to assure the coincidence of ends 8a and 8b of helical groove 8 with radial drilled holes 9a and 9b, and be accomplished by different methods, such as a key 14 (FIG. 1), engaged between collar 13 and the corresponding end of tubular screw 1. Flat lugs can likewise be fitted on screw 1 and on core 7 or its collar 13, to cooperate in immobilizing the core 7 in rotation. It is also possible to make tubes 10a – 11a and 10b – 11b of a rigid material, and to elongate them, with an appropriate shape, for a slight distance inside helical groove 8, beyond its ends 8a and 8b, in order to assure by these tubes the immobilization, both in axial translation and in rotation, of core 7 inside the tubular screw.

The embodiment of the mechanism according to this invention as illustrated schematically in FIG. 3 is similar to the one illustrated in FIGS. 1 and 2, and previously described, except for the fact that screw 21 is solid, and has a recessed coaxial drilled hole, 21c, in which core 27 is housed.

In the embodiment of the mechanism according to this invention, illustrated in FIG. 4, the means provided at the level of the entries to radial drilled holes of tubular screw 31, such as 9a, consist of helical elements made of metal or synthetic material, such as 40, which are engaged with a degree of play in coinciding helical grooves 32 and 35 of screw 31, and of nut 34, near the entries of the corresponding radial drilled holes 39. Each one of the helical guiding elements such as 40 is fastened to the bottom of helical groove 32 of screw 31 by any appropriate means, for example, by bonding or by dowel pin 40a engaged in a recessed hole machined into the bottom of groove 32 of screw 31. In addition, the end of each one of the helical guiding elements 40, which is turned toward the entry of the respective radial drilled hole 39, is shaped, as may be seen in FIG. 4, so as to guide the passage of balls 36 between said radial drilled hole 39 and the ball circulation channel 32-35, following a trajectory which has a relatively small curvature at all points, and particularly at the level of the entry of said radial drilled hole 39.

Figure 5:
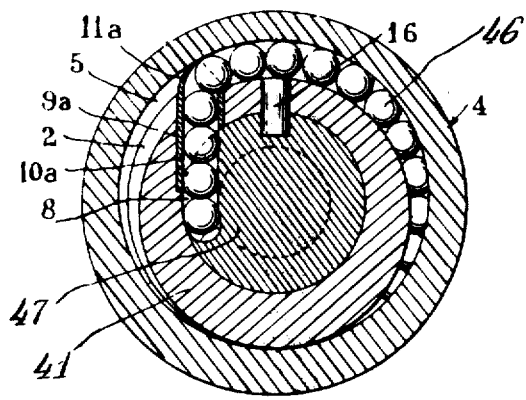
FIG. 5 is a sectional view, corresponding to FIG. 2, showing another embodiment of the invention.

The embodiment of the mechanism according to this invention illustrated in FIG. 5, is similar to the one illustrated in FIGS. 1 and 2, except by the fact that core 47 is immobilized, in axial translation and in rotation, inside its housing in tubular screw 41, by means of a pin 46, which traverses a hole drilled in the lateral wall of tubular screw 41, and becomes engaged in a recessed hole of core 47.

Other variations within the scope of the invention will be apparent to those skilled in the art.

What is claimed is:

1. In a screw and nut mechanism equipped with balls and including mating screw and nut members with at least one ball circulation channel defined by corresponding helical grooves in the adjacent surfaces of said screw and nut members, where rotation or translation of one of said members causes translation or rotation respectively of the other, the improvement in combination therewith wherein said screw member comprises a tubular cylinder with an axial bore defined through the cylinder wall and two axially spaced-apart holes extending radially through said wall, the mechanism further comprising within said bore a cylindrical core having an outer surface corresponding to said bore and having defined in said surface at least one helical recirculation channel with an axial length less than that of the nut and the core and a width slightly greater than the diameter of said balls, the recirculation channel having its ends in communication via said radial holes with the bottom of at least one of said helical grooves of the screw, said mechanism further comprising guide means adjacent said radial holes for guiding said balls between said circulation and recirculation channels.

2. A mechanism according to claim 1 wherein said guide means comprise a tube having an inner part in each of said radial holes and an outer part extending from said inner part into said circulation channel and being shaped for guiding said balls between said channels.

3. A mechanism according to claim 1 wherein said guide means comprise adjacent each of said radial holes a helical element attached to said screw member and extending into and with a degree of play in said circulation channel.

4. A mechanism according to claim 1 further comprising stop means engaged between said screw and said core for immobilizing in translation and rotation the core inside the bore of the screw.

5. A mechanism according to claim 4 wherein said stop means comprise a pin.

6. In a screw and nut mechanism including mating screw and nut members with at least one ball circulation channel defined by corresponding helical grooves in adjacent surfaces of said screw and nut members and a train of balls in said channel, where rotation or translation of one of said members causes translation or rotation respectively of the other member the improvement in combination therewith wherein said screw member comprises a tubular cylinder with an axial bore defined through the cylinder wall and two axially spaced-apart holes extending radially through said wall and communicating with said helical groove on the outer surface of said screw member, the mechanism further comprising a cylindrical core having an outer surface corresponding to that of said bore and fitting closely therein, and having defined in said core's outer surface a helical recirculation channel whose ends correspond to and communicate with said radial holes of the screw member, said mechanism further comprising guide means carried by said screw member adjacent said radial holes and extending into said helical groove of the nut member for guiding said balls between said circulation and recirculation channels.

7. A mechanism according to claim 6 wherein said guide means comprise a tube having an inner part in each of said radial holes and an outer part extending from said inner part into said circulation channel and being shaped for guiding said balls between said channels.

* * * * *